Nov. 12, 1968  J. VAN DER HEYDEN ET AL  3,410,287

PURE FLUID VELOCITY SENSOR CONTROL APPARATUS

Filed May 16, 1966  3 Sheets-Sheet 1

INVENTORS
JACQ VAN DER HEYDEN
GEORGE R. HOWLAND
BY
Gordon H. Chaney
AGENT

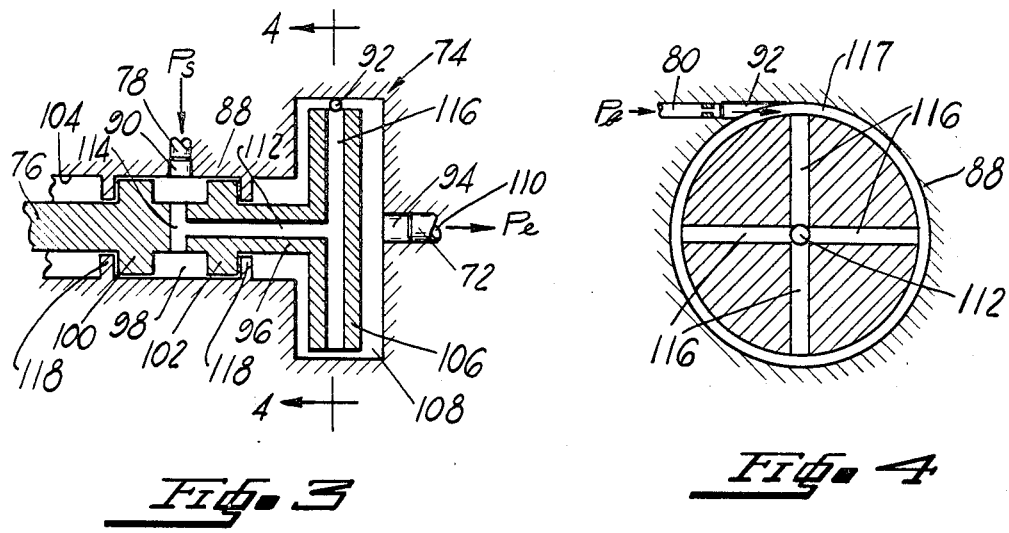
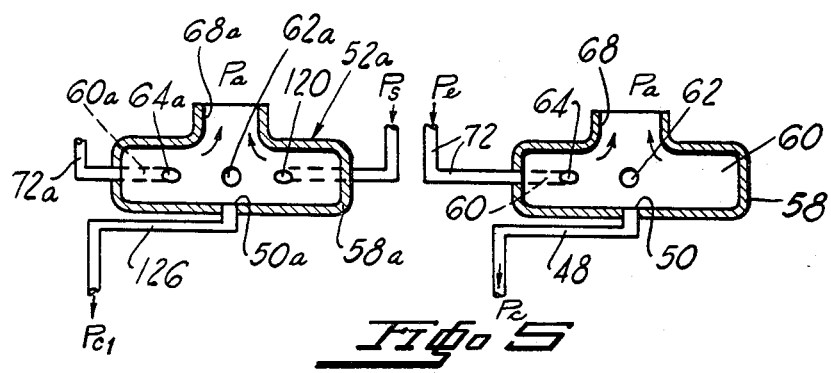

United States Patent Office 3,410,287
Patented Nov. 12, 1968

3,410,287
PURE FLUID VELOCITY SENSOR
CONTROL APPARATUS
Jacq Van Der Heyden, Orlando, Fla., and George Russell Howland, South Bend, Ind., assignors to The Bendix Corporation, a corporation of Delaware
Filed May 16, 1966, Ser. No. 550,557
6 Claims. (Cl. 137—36)

This invention relates, in general, to velocity sensing apparatus and, in particular, to a pure fluid vortex type velocity sensor for providing an output signal which varies as a function of an input velocity signal.

The present invention is an improvement of the basic pure fluid type velocity sensor shown and described in copending application Serial No. 414,088 filed Nov. 27, 1964, now Patent No. 3,347,103, in the names of Charles N. High and George R. Howland and having a common assignee.

It is an object of the present invention to provide a reliable, relatively simple and accurate velocity sensing device wherein a variable rotational input motion is converted to a corresponding variable output fluid pressure signal.

It is an object of the present invention to provide a pure fluid control system for regulating the speed of a rotatable member.

It is another object of the present invention to provide a velocity sensing device which requires a minimum number of moving parts to effect conversion of a variable rotational signal to a corresponding variable output fluid pressure signal.

It is an important object of the present invention to provide a pure fluid velocity sensing device for converting an input rotational velocity signal to an output fluid pressure signal.

Other objects and advantages of the present invention will be apparent to those persons skilled in the art from the following description and drawings wherein:

FIGURE 3 is a sectional view taken on line 3—3 of FIGURE 2;

FIGURE 4 is a sectional view taken on line 4—4 of FIGURE 3; and

FIGURE 5 is a sectional view taken on line 5—5 of FIGURE 2.

Figure 1:
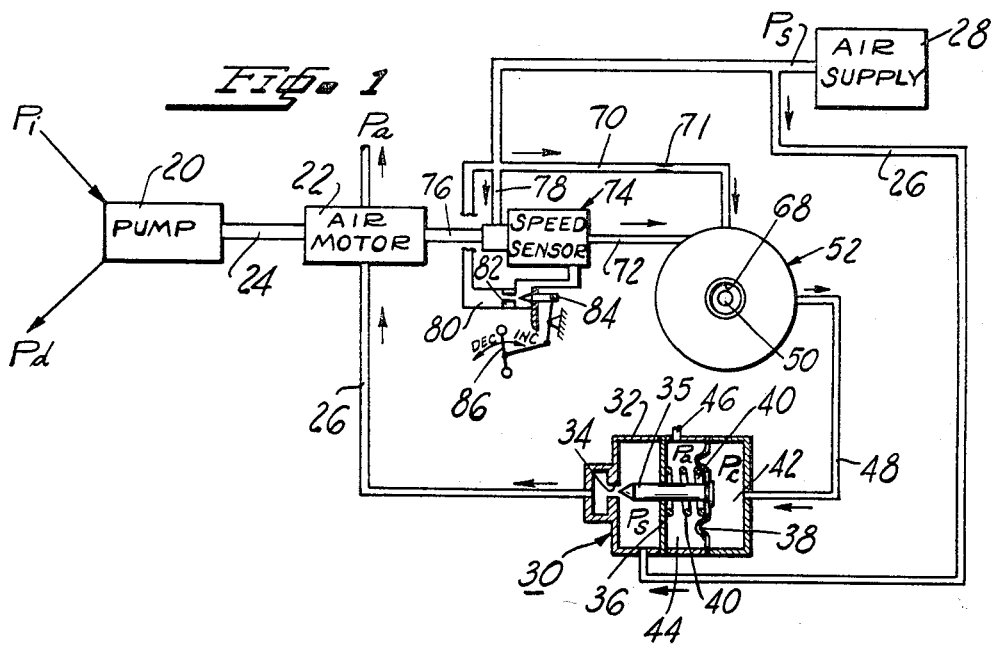
FIGURE 1 is a schematic representation of a control system embodying the present invention in the capacity of a single acting speed regulator.
Figure 2:
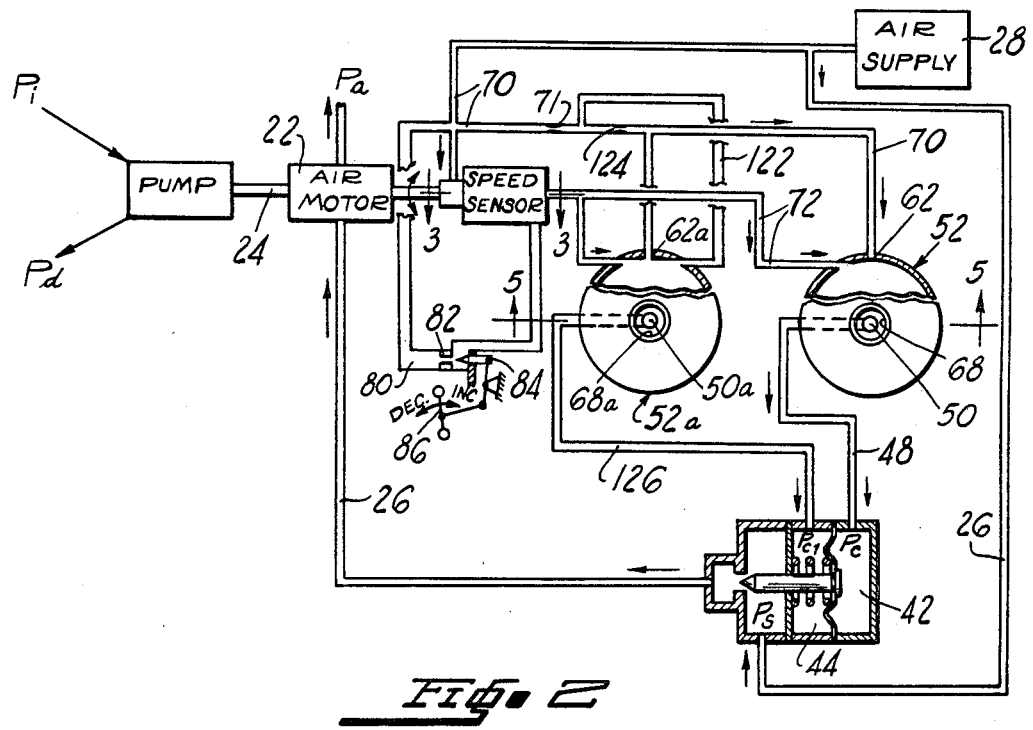
FIGURE 2 is a schematic representation of a control system embodying the present invention in the capacity of a push-pull speed regulator.

Referring to the drawings and FIGURES 1 and 2, in particular, numeral 20 represents a conventional rotary fluid pump adapted to receive fluid at inlet pressure $P_i$ and pressurize the same to pump discharge pressure $P_d$. A conventional air actuated motor generally indicated by 22 is connected to drive pump 20 via a shaft 24. An air supply conduit 26 transmits a controlled flow of pressurized air to the air actuated motor 22 from a suitable source of air generally indicated by 28. The air supply source 28 is maintained at a substantially constant relatively high pressure $P_s$.

The flow of pressurized air to the air motor 22 is controlled by valve means generally indicated by 30 which includes a chambered casing 32 having a variable area orifice 34 in series with conduit 26. A valve member 35 slidably carried in a wall 36 is provided with a contoured end which cooperates with orifice 34 to vary the effective flow area thereof in accordance with the position of valve 35. The opposite end of valve 35 is fixedly secured to the center portion of a flexible diaphragm 38 which has its radially outermost portion fixedly secured to casing 32 by any suitable connecting means, not shown, providing a fluid seal thereacross. The diaphragm 38 is preloaded by a compression spring 40 interposed between diaphragm 38 and wall 36 and is responsive to a control fluid pressure differential $P_c-P_a$ derived from chambers 42 and 44, respectively, oppositely disposed thereto. The chamber 44 is vented to atmospheric pressure $P_a$ via port 46 and the chamber 42 is vented via a passage 48 to an outlet port 50 of a vortex type fluid amplifier generally indicated by 52.

The vortex type fluid amplifier generally indicated by 52 is shown in section in FIGURE 5. The amplifier 52 is provided with a casing 58 defining a circular vortex chamber 60 having circumferentially spaced apart main inlet port 62 and control inlet port 64 and oppositely disposed centrally located and axially aligned outlet ports 50 and 68 in the walls thereof. A passage 70 having a restriction 71 therein transmits air at pressure $P_s$ from conduit 26 to main inlet port 62. A passage 72 transmits air at a controlled pressure $P_e$ to control inlet port 64 from a velocity sensor generally indicated by 74 which velocity sensor is actuated by air motor 22 via shaft 76. Reference is made to U.S. Patent No. 3,195,303, issued July 20, 1965, to G. M. Widell (common assignee) which discloses and claims a vortex fluid amplifier similar to amplifier 52 of the present application but without certain modifications made to adapt the present amplifier 52 to use in the present control system as well as improve the performance of the amplifier without affecting the basic operational characteristics thereof as set forth in U.S. Patent No. 3,195,303. Briefly the vortex amplifier 52 operates on the principle that fluid entering the main inlet port 62 passes through chamber 60 to outlet port 68 with little or no restriction in the absence of any flow from port 64. However, with a controlled relatively small mass fluid flow from port 64 injected tangentially into chamber 60, a vortex is created in chamber 60 by said controlled flow which generates a centrifugal force or pressure that impedes the main relatively large mass air flow from inlet port 62 thereby reducing or stopping flow from inlet port 62 which, in turn, causes a corresponding pressure variation at outlet port 68. Thus, the pressure $P_c$ outlet port 68 may be utilized as a control signal which varies as a function of the control flow at pressure $P_e$ injected by inlet port 64 which control flow may be subject to any desired parameter of operation such as control lever 86. Reference is made to U.S. Patent No. 3,195,303 for additional details of operation of vortex amplifier 52 for a fuller understanding of the operation thereof.

The velocity sensor 74 is supplied air at pressure $P_s$ via a branch passage 78 leading from passage 70. A control flow of air at pressure $P_b$ is supplied to velocity sensor 74 via a passage 80 leading from conduit 26 and provided with an orifice 82 in flow controlling relationship therewith. A contoured valve member 84 actuated by a control lever 86 is adapted to cooperate with orifice 82 to thereby control the effective flow area thereof and thus the pressure drop $P_s-P_b$ thereacross.

Referring to FIGURES 3 and 4, the velocity sensor 74 includes a casing 88 having a main inlet port 90 connected to passage 78 at pressure $P_s$, a restricted control inlet port 92 connected to passage 80 at pressure $P_b$ and an outlet port 94 connected to passage 72. A rotatable member 96 having an annulus 98 defined by spaced apart land portions 100 and 102 is rotatably supported in a bore 104 in casing 88 and driven by shaft 76. An enlarged diameter end portion 106 of rotatable member 96 extends into a circular chamber 108 at one end of bore 104 which chamber is provided with an axial outlet port 94 connected to passage 72. The rotatable member 96 is provided with an axial passage 112 connected at one end to radial passages 114 leading from annulus 98 and at the opposite end to a plurality of radial passages 116 in end portion 106 from which pressurized air is discharged to chamber 108. The adjacent relatively closely spaced apart concentric curved surfaces of enlarged diameter end portion 106 and chamber 108 define a flow annulus 117 into which the control flow discharged by control inlet port 92 is injected tangentially across the discharge end of radial passages 116. The land portions 100 and 102 are adapted to slidably engage annular projections 118 of casing 88 or any suitable sealing means providing a reasonable efficient fluid seal to minimize air flow from annulus 98 across land portions 100 and 102. The control inlet port 92 is arranged to inject air at presspre $P_b$ tangentially into chamber 108 as will be explained hereinafter. Reference is made to copending U.S. patent application Ser. No. 414,088 filed November 27, 1964. in the name of Charles N. High and George R. Howland (common assignee) for additional details of structure and operation of a velocity sensor basically similar to velocity sensor 74. The present velocity sensor 74 represents a modified form of the basic velocity sensor of application Ser. No. 414,088 which modification includes control inlet port 64.

Referring to FIGURE 2 which is similar to FIGURE 1 with the exception of a second vortex type fluid amplifier, which is added to the system to provide push-pull type control, structure similar to that of FIGURE 1 is identified by like numerals with the subscript $a$ added to identify the structure of the second vortex type amplifier not shown in FIGURE 1.

The vortex amplifier 52a is provided with a second control inlet port 120 (see FIGURE 5) connected to passage 70 at pressure $P_s$ via a passage 122 which connects with passage 70 intermediate restriction 71 and second restriction 124. The outlet port 50a of vortex amplifier 52a is vented via passage 126 to chamber 44 of valve means 30 thereby substituting a control air pressure $P_{c1}$ for the atmospheric air pressure $P_a$ of FIGURE 1 which results in valve member 34 being positioned as a function of the $P_c-P_{c1}$ generated across diaphragm 38. The restrictions 71 and 124 are sized as necessary to ensure that the relatively larger flow of air injected by main ports 62 and 62a is at a pressure lower than the relatively smaller mass air flow injected by ports 64, 64a and 120.

*Operation of FIGURE 1*

It will be assumed that the pump 20 is operating at a steady speed corresponding to a selected position of control lever 86. The rotatable member 96 being coupled to air motor 22 driving pump 20 is driven accordingly. Air at pressure $P_s$ flows to passages 116 from which the air is discharged with a tangential velocity which is a function of the rotational velocity of rotatable member 96 thereby creating a swirl of vortex flow pattern in the circular chamber 108 as the air passes therethrough to outlet port 110. The vortex flow generated in chamber 108 acts as a restriction or impedance to the passage of air from passages 116 to outlet port 110 thereby causing a corresponding drop in air pressure $P_s$ to pressure $P_e$ at outlet port 110 which pressure $P_a$ is a function of the rotational velocity of member 96.

The control inlet port 92 receives air at pressure $P_b$ which is derived from pressure $P_s$ by virtue of the effective flow area of orifice 82 established by valve 84 as a function of the position of control lever 86. The control inlet port 92 discharges air tangentially into chamber 108 in the direction of rotation of member 96 which air flow impinges the curved wall of chamber 108 thereby generating a vortex flow pattern in chamber 108 as the air passes therethrough to outlet port 110. The vortex flow resulting from inlet port 92 acts as an impedance to flow from passages 116 thereby imposing a bias on the speed sensing function of sensor 74 such that the speed of rotation of member 96 at which a given impedance to air flow through chamber 108 as represented by pressure $P_e$ is varied depending upon the air flow injected by inlet port 92 as a function of control level 86 position.

The air at pressure $P_e$ passes out of port 110 to inlet port 63 of vortex amplifier 52 where it is injected tangentially into chamber 60 causing a swirl or vortex flow therein as the air passes through chamber 60 to outlet ports 68 and 50. The main flow of air at pressure $P_s$ passing through inlet port 62 to chamber 60 encounters the established vortex flow which opposed the flow of air from inlet port 62 to the extent of the centrifugal force or pressure generated by the vortex flow. Thus, the main flow of air injected by main inlet port 62 undergoes a pressure drop from pressure $P_s$ to pressure $P_c$ at outlet port 50 which pressure $P_c$ varies in inverse proportional relation to pressure $P_e$ of the air injected by control port 64. The air at pressure $P_c$ passes out of outlet port 50 to chamber 42 via passage 48 where it acts against diaphragm 38. The resulting $P_c-P_a$ pressure differential across diaphragm 38 generates a force which is absorbed by compression spring 40 acting in opposition thereto thereby positioning valve 35 accordingly, which, in turn, regulates the effective flow area of orifice 34 and thus the air flow to air motor 22 to maintain the speed of pump 20 at the selected value corresponding to the position of control lever 86.

Now, assuming that a greater pump 20 speed is desired, the control lever 86 is actuated accordingly in the increase direction to the position corresponding to the desired speed which results in valve 84 moving accordingly to a position reducing the effective area of orifice 82 which, in turn, results in a greater pressure drop $P_s-P_b$ across orifice 82. The reduced pressure $P_b$ of the air passing to control inlet port 92 results in a lower mass of air injected by port 92 which, in turn, reduces the impedance effect of the vortex flow in chamber 108 to flow out of passages 116 thereby causing an increase in pressure $P_e$ at outlet port 110. The increase in pressure $P_e$ of the air passing to inlet port 64 of amplifier 52 results in increased vortex flow in chamber 60 and a corresponding greater impedance to air flow out of main inlet port 62 which, in turn, results in a decrease in pressure $P_c$ at outlet port 50. The resulting decrease in pressure differential $P_c-P_a$ across diaphragm 38 allows spring 40 to urge valve 35 in an opening direction thereby increasing the air flow to air motor 22 which, in turn, undergoes a speed increase. The rotational speed of pump 20 as well as rotatable member 96 increases in accordance with air motor 22 resulting in an increase in the tangential velocity of the air discharged from passages 116 to chamber 108 thereby increasing the impedance effect of the vortex flow in chamber 108. The decrease in pressure $P_e$ at outlet port 110 resulting from the increased impedance to air flow through chamber 108 has the effect of reducing air flow at inlet port 64 of amplifier 52 which, in turn, reduces the impedance effect of vortex flow in chamber 60 causing a corresponding rise in pressure $P_c$ at outlet port 50. The resulting increase in pressure differential $P_c-P_a$ across diaphragm 38 loads valve 35 in a closing direction thereby reducing air flow to air motor 22 to stabilize the speed thereof and thus pump 20 in accordance with the selected position of control lever 86. It will be recognized that the closed loop characteristic of the above described system permits substantially instantaneous control over valve 35 by pressure $P_c$ which varies as a function of control lever 86 position and pump 20 speed to maintain the speed of pump 20 at the selected value established by the position of control lever 86.

A decrease in the speed of pump 20 may be initiated by moving the control lever 86 in a decrease direction whereupon the above described sequence will be reversed accordingly to reduce the effective area of orifice 34.

*Operation of FIGURE 2*

FIGURE 2 represents a modified version of the control network of FIGURE 1 in which two vortex amplifiers 52 and 52a are provided in push-pull relationship to reduce sensitivity of the system to temperature variations as well as noise and/or pressure variations associated with the air supplied by the source 28 which variations may affect the control function of the amplifier 52 to the extent of a spurious control output pressure $P_e$ for a given control lever 86 position and/or speed of rotatable member 96.

It will be understood that a greater or less pump 20 load exerted on air motor 22 causing the latter to slow down or speed up, respectively, will result in an underspeed or overspeed signal relative to the set position of control lever 86 which, in turn, causes the pressure $P_e$ to vary accordingly resulting in valve 35 opening or closing to increase or decrease the air flow to airmotor 22 as necessary depending upon the relative speed error.

That portion of FIGURE 2 similar to FIGURE 1 operates in the manner heretofore mentioned with regard to FIGURE 1. The second vortex amplifier 52a receives air at supply pressure $P_s$ via main inlet port 62a and air at control pressure $P_e$ via control inlet port 64a. However, unlike amplifier 52 which provides increasing impedance to flow through chamber 60 with an increase in control flow from control inlet port 64, a constant flow of air introduced via control inlet port 120 to chamber 60a in opposition to the control flow injected by control inlet port 64a results in a decreasing impedance to flow through chamber 60a with an increase in flow from inlet port 64a. Thus, for a given input flow at pressure $P_e$ at each of the control inlet ports 64 and 64a, an output pressure $P_c$ will be generated at outlet port 50 and an output pressure $P_{c1}$ substantially less than $P_c$ will be generated at outlet port 50a. As the control inlet flow at ports 64 and 64a increases or decreases the pressure differential $P_c-P_{c1}$ between outlet ports 50 and 50a decreases or increases, respectively, thereby providing control over the diaphragm controlled valve 35 in the manner heretofore mentioned in regard to FIGURE 1. The pressure differential $P_c-P_{c1}$ will remain constant irrespective of noise and pressure variations created by temperature variations on the air supply to the amplifiers 52 and 52a by virtue of the push-pull relationship established therebetween.

Figure 6:
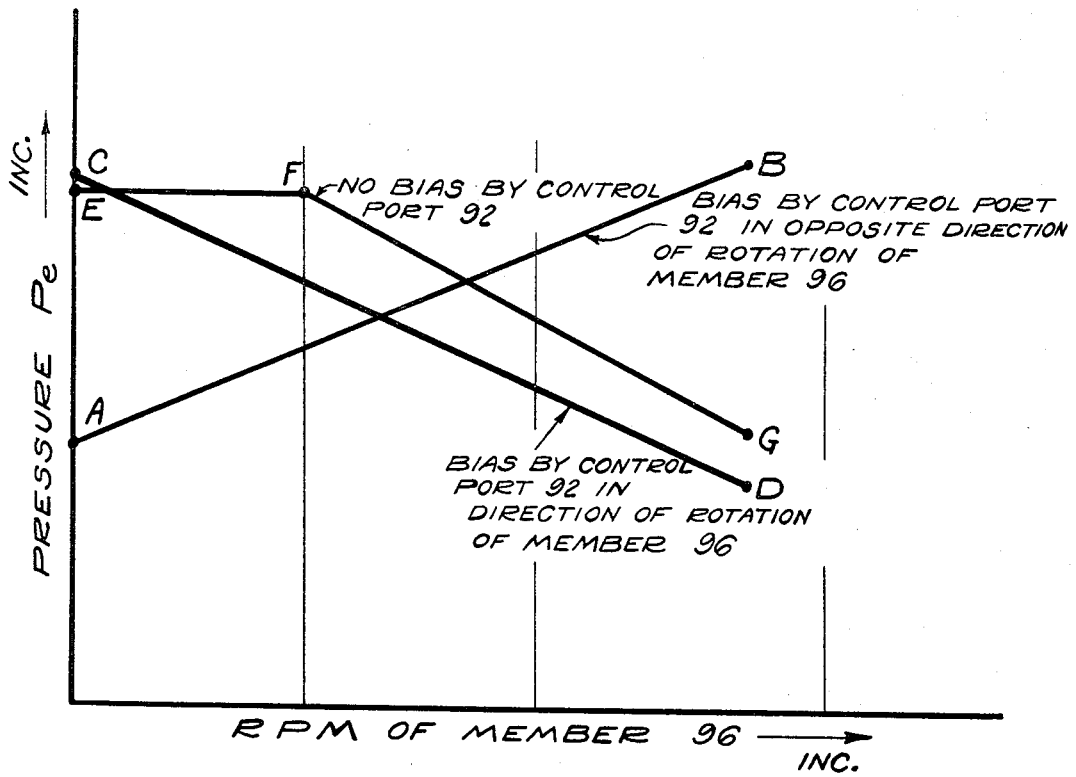
FIGURE 6 represents a series of curves having a speed vs. output pressure $P_e$ relationship for various modification of applicants' velocity sensor as identified by the titles associated therewith.

FIGURE 6 indicates the pressure $P_e$ vs. speed of rotation of member 96 relationship obtained by the above described arrangement of control inlet port 92 which injects air tangentially into chamber 108 in the direction of rotation of member 96 (curve CD). If desired, the control inlet port 92 could be oppositely located relative to the position shown in FIGURE 4 so that air would be injected tangentially into chamber 108 in the opposite direction of rotation of member 96 thereby producing the relationship indicated by curve AB. With no control inlet port 92 as is the case in the velocity sensor of the heretofore mentioned copending application, Ser. No. 414,088, the rotatable member 96 would have to attain a predetermined velocity before sufficient control impedance could be obtained in chamber 108 to produce an output pressure $P_e$ change.

It will be recognized that applicants' control apparatus is not limited to use with the pump 20 and air motor 22 since the pump 20 is intended as but one form of variable load and any suitable prime mover may be substituted for the air motor 22. The valve 35 may be replaced by suitable control mechanism if the prime mover is other than a fluid driven device.

It will be apparent to those persons skilled in the art that various changes in the form and relative arrangement of parts may be made to suit requirements of a particular system without departing from the scope of applicants' invention as defined by the following claims.

What is claimed is:

1. Control apparatus for controlling the speed of a rotatable member in accordance with a request input signal, said control apparatus comprising:
    casing means provided with a fluid inlet and defining a circular swirl chamber having a centrally located fluid outlet;
    a source of fluid at substantially constant pressure connected to said fluid inlet;
    rotatable means supported for rotation in said swirl chamber and connected to be driven by the rotatable member;
    passage means in said rotatable means connected to receive pressurized fluid from said fluid inlet and to inject said pressurized fluid into said swirl chamber to generate a fluid swirl therein which varies in absolute velocity as a function of the rotational velocity of said rotatable leans;
    a control inlet port in said casing connected to receive pressurized fluid from said fluid source and inject the same tangentially into said chamber to thereby modify the swirl velocity of said generated swirl;
    fluid flow control means responsive to the request input signal and connected to control the flow of pressurized fluid from said fluid source to said control inlet port as a function of the request input signal;
    said fluid swirl acting as a variable impedance to fluid flow through said chamber from said passage means to said fluid outlet to produce a corresponding variable output fluid pressure signal at said fluid outlet; and
    means responsive to said output fluid pressure signal for controlling the speed of the rotatable member.

2. Control apparatus as claimed in claim 1 wherein:
    said rotatable means includes an axially extending shaft portion journaled in said casing and an enlarged diameter end portion concentric with and rotatable in said swirl chamber;
    said passage means defined by an axially extending passage in said shaft portion and at least one radially extending passage in said enlarged diameter end portion.

3. Control apparatus as claimed in claim 1 wherein said means responsive to said output fluid pressure signal is a fluid pressure amplifying device including:
    a casing defining a second circular swirl chamber having a second main inlet port connected to receive pressurized fluid from said fluid source;
    a second control inlet port connected to receive pressurized fluid from said centrally located outlet port; and
    a second centrally located outlet port;
    said second control inlet port being operative to discharge said pressurized fluid tangentially into said second swirl chamber to generate a fluid swirl therein which impedes the relatively larger flow of fluid from said main inlet port thereby establishing a corresponding amplified fluid pressure signal at said second outlet port.

4. Control apparatus as claimed in claim 1 wherein said fluid flow control means includes:
    a conduit connected to supply fluid from said fluid source to said control inlet port;
    a restriction in said conduit for controlling fluid flow therethrough; and
    valve means responsive to the request input signal operatively connected to said restriction for varying the effective flow area thereof in accordance with the request input signal.

5. Control apparatus as claimed in claim 2 wherein:
    said radially extending passage discharges fluid radially outwardly from said enlarged diameter end portion into an annular flow passage defined by spaced apart peripheral surfaces of said enlarged diameter end portion and adjacent circular swirl chamber; and said control inlet port discharges pressurized fluid tangentially into said annular flow passage.

6. Control apparatus as claimed in claim 1 wherein said means responsive to said output fluid pressure signal is a fluid pressure amplifying device including:

a first casing defining a second circular swirl chamber having a second main inlet port connected to receive pressurized fluid from said fluid source;

a second control inlet port in said first casing connected to receive pressurized fluid from said centrally located outlet port;

a second centrally located outlet port in said first casing;

a second casing defining a third circular swirl chamber having a third main inlet port connected to receive pressurized fluid from said fluid source;

a third control inlet port in said second casing connected to receive pressurized fluid from said centrally located outlet port;

a third centrally located outlet port in said second casing; and a fourth control inlet port in said second casing connected to receive pressurized fluid from said source;

said second control inlet port being operative to discharge said pressurized fluid tangentially into said second swirl chamber to generate a fluid swirl therein which impedes the relatively larger flow of fluid from said second main inlet port thereby establishing a corresponding amplified fluid pressure signal at said second outlet port;

said third control inlet port being operative to discharge said pressurized fluid tangentially into said third swirl chamber in opposition to the pressurized fluid injected tangentially into said swirl chamber by said fourth control inlet port to generate a fluid swirl in said third swirl chamber which impedes the relatively larger flow of fluid from said third main inlet port thereby establishing a corresponding amplified fluid pressure signal at said third outlet port; and fluid pressure responsive means responsive to the differential between said amplified fluid pressure signals at said second and third outlet ports.

References Cited

UNITED STATES PATENTS

| | | | |
|---|---|---|---|
| 2,247,989 | 7/1941 | Cita | 137—36 |
| 2,450,199 | 9/1948 | Leibing | 137—36 X |
| 2,454,565 | 11/1948 | Peterson | 137—36 |
| 2,567,753 | 9/1951 | Alfaro | 137—37 |
| 2,642,275 | 6/1953 | Sollinger | 137—36 |
| 2,857,150 | 10/1958 | Sharp | 137—36 |
| 3,028,847 | 4/1962 | Sterner | 137—36 X |
| 3,276,259 | 10/1966 | Bowles | 137—81.5 X |
| 3,342,196 | 9/1967 | Przybylko | 137—36 |

CLARENCE R. GORDON, *Primary Examiner.*